(12) United States Patent
Akimoto (10) Patent No.: US 6,775,711 B1
(45) Date of Patent: Aug. 10, 2004

(54) EMAIL COMMUNICATION SYSTEM NAMING USING A SPECIFIC IDENTIFICATION CHARACTER IN ADDITION TO A COMPLETE ADDRESS FOR PERFORMING A PREDETERMINED PROCESS

(75) Inventor: Masao Akimoto, Kunitachi (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/387,514

(22) Filed: Sep. 1, 1999

(30) Foreign Application Priority Data

Mar. 30, 1999 (JP) .......................................... 11-087976

(51) Int. Cl.[7] .............................................. G06F 15/16
(52) U.S. Cl. ...................................... 709/245; 709/246
(58) Field of Search ................................ 709/202, 245, 709/246, 228, 250

(56) References Cited

U.S. PATENT DOCUMENTS

| | | | |
|---|---|---|---|
| 5,245,532 A | * | 9/1993 | Mourier |
| 5,406,557 A | * | 4/1995 | Baudoin |
| 5,805,298 A | | 9/1998 | Ho et al. |
| 5,819,261 A | * | 10/1998 | Takahashi et al. |
| 5,881,233 A | | 3/1999 | Toyoda et al. |
| 5,923,848 A | * | 7/1999 | Goodhand et al. |
| 5,999,938 A | * | 12/1999 | Bliss et al. |
| 6,088,700 A | * | 7/2000 | Larsen et al. |
| 6,104,500 A | * | 8/2000 | Alam et al. |
| 6,150,962 A | * | 11/2000 | Rossmann |
| 6,182,273 B1 | * | 1/2001 | Tarumi |
| 6,185,603 B1 | * | 2/2001 | Henderson et al. |
| 6,223,168 B1 | * | 5/2001 | McGurl et al. |
| 6,243,480 B1 | * | 6/2001 | Zhao et al. |
| 6,282,574 B1 | * | 8/2001 | Voit |
| 6,285,777 B2 | * | 9/2001 | Kanevsky et al. |
| 6,313,736 B1 | * | 11/2001 | Hymel et al. |
| 6,321,267 B1 | * | 11/2001 | Donaldson |
| 6,345,318 B1 | * | 2/2002 | Gamon |
| 6,356,356 B1 | * | 3/2002 | Miller, Jr. et al. |

(List continued on next page.)

FOREIGN PATENT DOCUMENTS

| | | |
|---|---|---|
| JP | 59201579 | 11/1984 |
| JP | 2279064 | 11/1990 |
| JP | 8-242326 | 9/1996 |
| JP | 9298617 | 11/1997 |
| JP | 10-41973 | 2/1998 |
| JP | 10173806 | 6/1998 |
| JP | 10334007 | 12/1998 |

OTHER PUBLICATIONS

Jonathan Postel, RFC 788, Nov. 1981, USC.*
J, Klensin, RFC 1869, Nov. 1995.*
G. Vaudreuil, RFC 1893, Jan. 1996, Octel Network Services.*

(List continued on next page.)

Primary Examiner—Le Hien Luu
Assistant Examiner—Stephan Willett
(74) Attorney, Agent, or Firm—Greenblum & Bernstein, P.L.C.

(57) ABSTRACT

An input value from a panel is analyzed by mail address analyze means. A determination section performs determination based on the analysis result. When an identification character "@" is detected in the input value, the determination section instructs an encryption processing section to execute encryption processing, which is made to correspond to the identification character "@". A mail transmitting section transmits data subjected to encryption processing in accordance with an e-mail transfer protocol. An operator has only to add the identification character "@" to a recipient address from the panel so that an image communication apparatus executes encryption processing. This eliminates the need for adding a new button when a new function is added to the image communication apparatus.

20 Claims, 8 Drawing Sheets

U.S. PATENT DOCUMENTS

| | | | |
|---|---|---|---|
| 6,370,567 B1 * | 4/2002 | Ouchi | |
| 6,374,291 B1 * | 4/2002 | Ishibashi et al. | |
| 6,424,426 B1 * | 7/2002 | Henry | |
| 6,496,836 B1 * | 12/2002 | Ronchi et al. | |
| 6,519,646 B1 * | 2/2003 | Gupta et al. | 709/245 |
| 2001/0014890 A1 * | 8/2001 | Liu et al. | |
| 2001/0039615 A1 * | 11/2001 | Bowker et al. | |
| 2002/0020750 A1 * | 2/2002 | Dymetman et al. | |

OTHER PUBLICATIONS

J. Meyers, RFC 2033, Oct. 1996, Carnegie Mellon.*

N. Freed, RFC 2034, Oct. 1996, Innosoft.*

R. Gellens, RFC 2645, Aug. 1999, Qualcomm.*

IBM, TDB–Acc–Np; NB9003278, Mar. 1, 1990, IBM.*

An English Language abstract of JP 8–242326.

"Decision of Rejection" by the Japanese PTO.

English Translation of "Decision of Rejection" by the Japanese PTO.

An English Language abstract of JP 10–41973.

English language abstract of JP 10–334007.

Network Working Group Request For Comments: 2305 Category: Standards Track, entitle "A Simple Mode Of Facsimile Using Internet Mail", published in Mar. 1998, by K. Toyoda et al.

* cited by examiner

| IDENTIFICATION CHARACTER | PROCESSING CONTENT |
|---|---|
| A | SIGNATURE PROCESSING |
| B | ENCRYPTION PROCESSING |
| C | JPEG CONVERSION |

FIG.8

EMAIL COMMUNICATION SYSTEM NAMING USING A SPECIFIC IDENTIFICATION CHARACTER IN ADDITION TO A COMPLETE ADDRESS FOR PERFORMING A PREDETERMINED PROCESS

BACKGROUND OF THE INVENTION

1. Field of the Invention

The present invention relates to an e-mail communication apparatus and an image communication apparatus having the same. The present invention further relates to an Internet facsimile apparatus. Furthermore, the present invention relates to an E-mail communication method.

2. Description of the Related Art

As the widespread use of Internet increases, for example, Internet facsimile apparatus has been in practical use in recent years. For example, this Internet facsimile apparatus is connected to an Internet provider from a local area network (LAN) via a leased line. This establishes Internet connection, and exchanges image data communication as an e-mail between terminals each connected to a different LAN through the Internet. The Internet facsimile apparatuses further have communication device such a modem, a network communication device or the like, can communicate with recipient terminals over the public switched telephone network such as analog telephone network and ISDN.

In the above-mentioned Internet facsimile apparatus, when a new function is added to a function, which has been already realized, it is necessary to add a switch to a panel section and change software in order to make the function valid or invalid by an operator. For example, in a case where an encryption function is added to the Internet facsimile apparatus and the apparatus sets the function with hardware, a switch for allowing the panel section to execute encryption processing must be provided in the apparatus. Also, in a case where the apparatus sets the function with software, software for controlling a display of a display device must be updated such that a menu can be displayed on the display of the apparatus to select whether or not encryption is performed using this menu.

However, if the addition and change in the switch are made to the apparatus for setting the function with hardware in order to add the new function, a managing cost and a cost of parts in the production process are increased. Also, if the change in the software for controlling the display of the display device is made to the apparatus for setting the function with software in order to add the new function, a developing cost increases.

SUMMARY OF THE INVENTION

An object of the present invention is to provide an e-mail communication apparatus, which is capable of adding a new function with a simple configuration without increasing costs.

Also, an object of the present invention is to provide an image communication apparatus comprising the above-mentioned e-mail communication apparatus.

Further, an object of the present invention is to provide an e-mail communication apparatus, which is capable of adding a new function with a simple method without increasing costs.

In order to attain the above object, according to the present invention, an operator inputs characters including at least a mail address, Then, when these characters are analyzed and a specific identification character is detected in the characters as a result of this analysis, processing, which is made to correspond to the identification character, is executed.

Thereby, it is possible to add a new function to the e-mail apparatus without providing a switch for executing specific processing to the e-mail apparatus, and the operator can use the new function by a simple operation.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will now be specifically explained with reference to the drawings accompanying therewith.

First Embodiment

Figure 1:
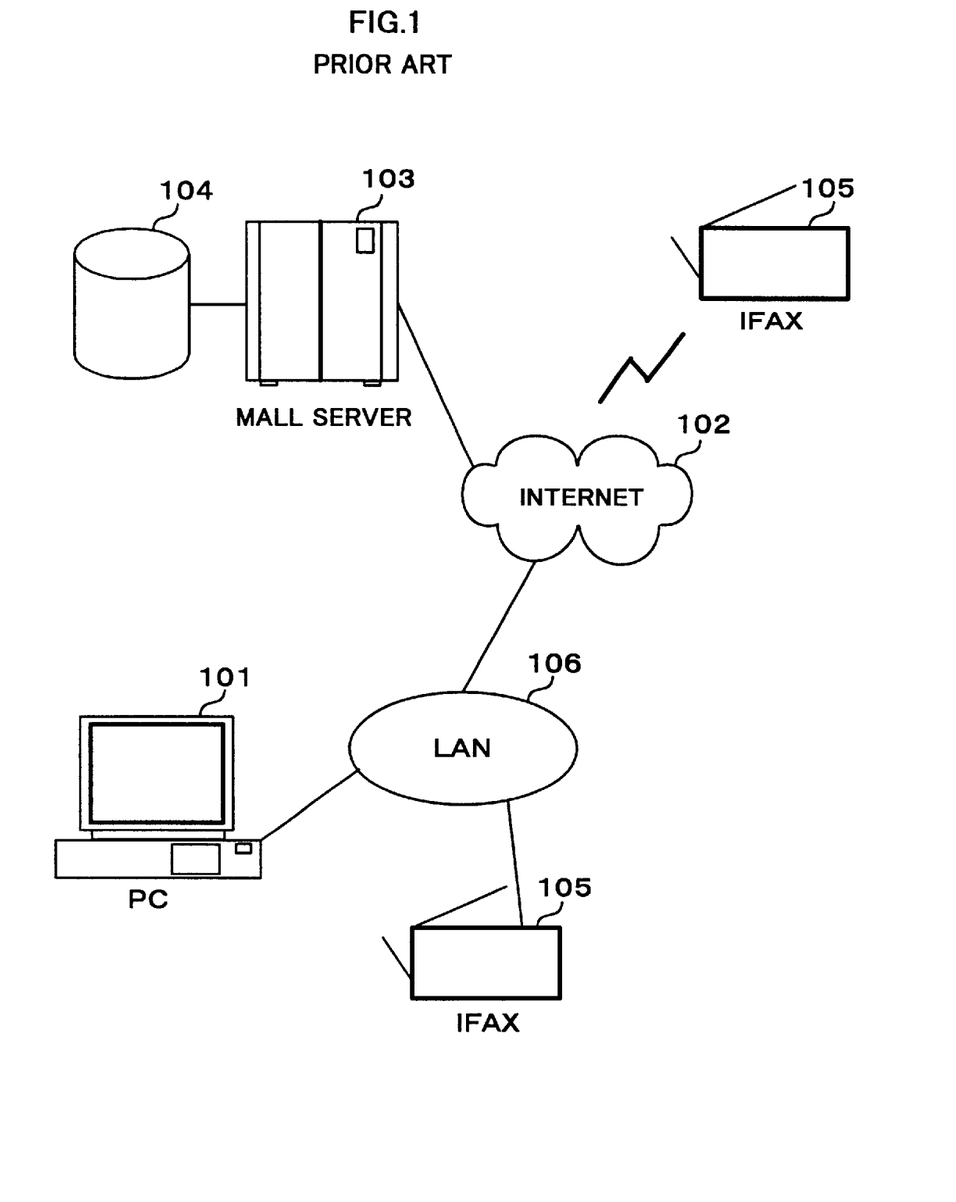
FIG. 1 is a conceptual view of an e-mail communication system.

With reference to FIG. 1, a case in which an e-mail is generally received and transmitted via a mail server will be explained. FIG. 1 is a conceptual view of an e-mail communication system. An e-mail is transmitted from a PC 101. The e-mail is stored in a secondary storage apparatus for a mail server 103 provided on the Internet 102. An image communication apparatus (Internet facsimile apparatus: IFAX) 105, serving as a recipient terminal, makes an inquiry to the mail server 103. If there is an e-mail arrived in the mail server 103 (hereinafter referred to as incoming mail), IFAX 105 receives the incoming mail from the mail server 103.

The mail server 103 comprises SMTP (Simple Mail Transfer Protocol), POP (Post Office Protocol). The mail server 103 stores the e-mails in the secondary storage apparatus 104 in order of incoming. If there is an inquiry from the recipient terminal, the mail server 103 notifies of the total number of incoming mails after recognizing a user. Also, if there is a forwarding request from the recipient terminal, the mail server 103 transmits the e-mail, and if there is a deletion request, the mail server 103 deletes the e-mail. IFAX 105 is connected to Internet 102 through a LAN 106 or by a dial-up connection.

Figure 2:
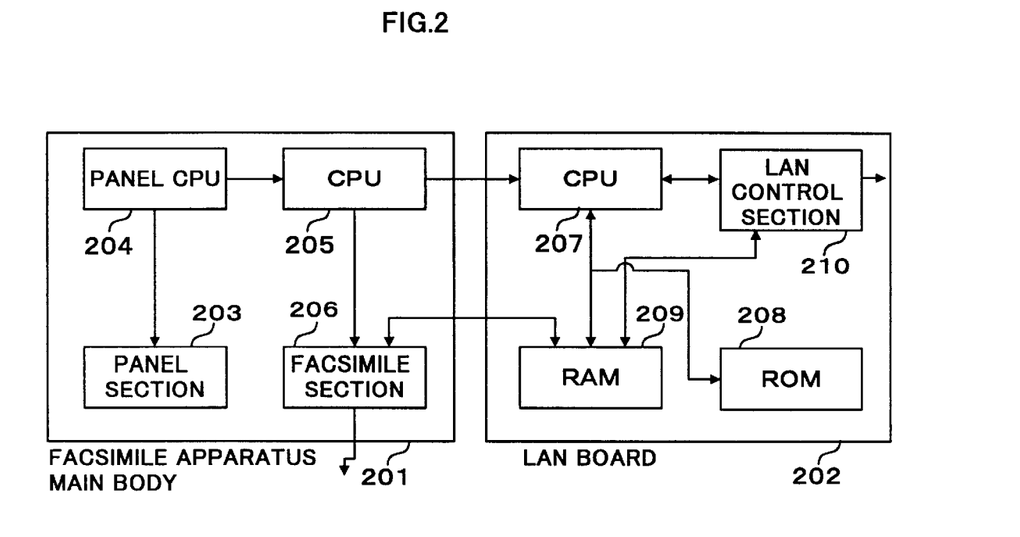
FIG. 2 is a block diagram showing a hardware configuration of an image communication apparatus according to a first embodiment of the present invention.

FIG. 2 is a block diagram showing a hardware configuration of the image communication apparatus according to a first embodiment of the present invention. The image communication apparatus according to the first embodiment of the present invention has a facsimile apparatus main body 201 and a LAN board 202. In the facsimile apparatus main body 201, a user performs various kinds of operations through a panel section 203. A panel CPU 204 mainly controls a signal input from the panel section 203. Also, a CPU 205 controls a signal to be output to the LAN board 202 and also controls a facsimile section 206 for performing communications through a public switched telephone network. The facsimile section 206 includes a scanner, a compression/decompression section, and a printer. At a transmitting time, the scanner scans an original, and generates bit map data. The compression/decompression section compresses this bit map data to a compressed format, for example, MH, which is used in facsimile communications. While, at a receiving time, the compression/decompression section decompresses a received MH file to obtain bit map data, and the printer prints out the obtained bit map.

Also, in the LAN board 202, a CPU 207 executes a program to control the entire apparatus. A ROM 208 stores the program executed by CPU 207. A RAM 209 has a work area for executing the program and a buffer area for temporarily storing various kinds of data such as an e-mail, an image file, etc. A LAN control section 210 is an interface for executing procedures necessary for receiving and transmitting the e-mail on the Internet 106.

In the above-structured image communication apparatus according to the first embodiment of the present invention, at the time of transmission, the scanner of the facsimile section 206 scans the original to obtain bit map data. The compression/decompression section compresses these bit map data to the MH files. One file for one page of the original is generated. This MH files are stored in the buffer area of RAM 209.

Figure 3:
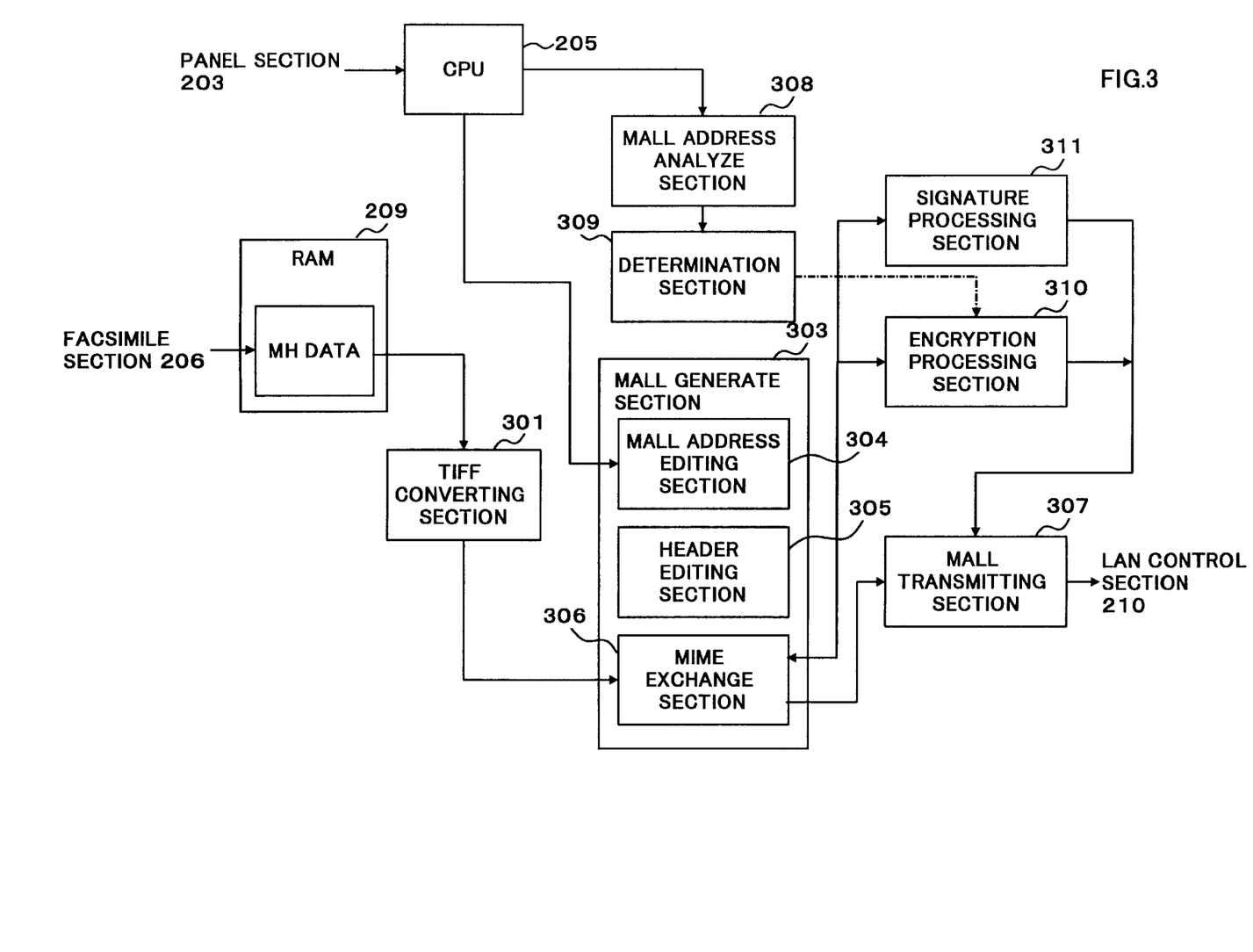
FIG. 3 is a block diagram for explaining an Internet facsimile function of the image communication apparatus according to the first embodiment of the present invention.

FIG. 3 is a block diagram for explaining an Internet facsimile function of the image communication apparatus according to the first embodiment of the present invention. The Internet facsimile function can be realized by the program, which CPU 207 executes.

A TIFF converting section 301 converts the MH files to a TIFF file. One TIFF file stores a plurality of MH files.

While, input data containing a mail address of transmission destination of the e-mail (thereinafter referred to as recipient address) is transmitted to a mail generate section 303 by CPU 205 in accordance with an input from the panel section 203.

The mail generate section 303 has a mail address editing section 304, a header editing section 305, and a MIME exchange section 306. The address editing section 304 deletes an identification character from the input data when the identification character is added to the recipient address to be described later in the input data. The header editing section 305 inputs the recipient address into a [To:] field of a mail header.

The MIME exchange section 306 generates an e-mail including the TIFF file as an appended file. In other words, the MIME exchange section 306 text-codes the TIFF file and adds it to a data section of a multi-part mail in accordance with MIME.

A mail transmitting section 407 sends e-mail data generated by the mail generate section 303 to the mail server 103 shown in FIG. 1 through the LAN control section 210.

Also, CPU 205 sends input data including the recipient address to a mail address analyze section 308. The mail address analyze section 308 analyzes the presence or absence of the identification character in input data. The mail address analyze section 308 notifies a determination section 309 of the analysis result. The determination section 309 determines whether or not an encryption processing section 310 performs encryption in accordance with the analysis result obtained by the mail address analyze section 308.

The encryption processing section 310 encrypts e-mail data generated by the mail generate section 303 in accordance with the determination result of the determination section 309.

A signature processing section 311 provides signature processing to e-mail data when there is a certification of recipient in the mail to be described later.

While, at the receiving time, the e-mail is received from the mail server 103 through the LAN control section 210, and CPU 207 binary converts an appended file portion of the received e-mail to a TIFF file from the text code. Thereafter, CPU 207 expands the TIFF file so as to obtain MH files. The compression/decompression section of the facsimile section 206 decompresses the MH files so as to obtain bit map data. The compression/decompression section sends these bit map data to the printer of the facsimile section 206. The printer prints out bit map data.

Figure 4:
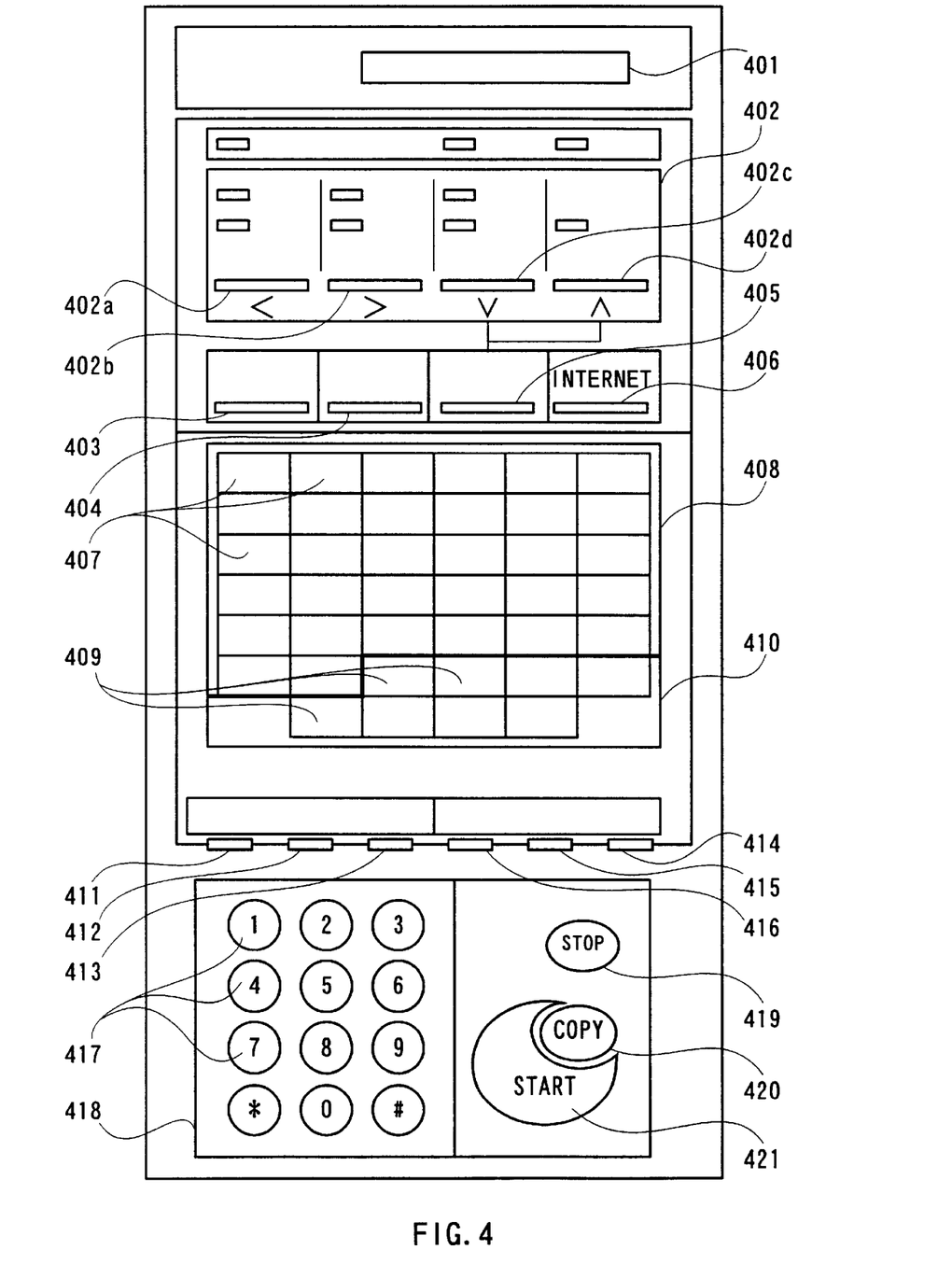
FIG. 4 is a plane view showing a panel section of the image communication apparatus according to the first embodiment of the present invention.

FIG. 4 is a plane view showing a panel section of the image communication apparatus according to the first embodiment. The panel section 203 comprises a display section 401, which is formed of for example an LCD, on the top. A print setting section 402, having a plurality of print setting buttons 402a to 402d arranged, is provided at the lower portion of the display section 401. The print setting buttons 402a to 402d perform printing settings such as print density, character size, half tone, stamped, respectively.

At the lower portion of the print setting section 402, there are arranged a memory button 403, a function button 404, a quick dial button 405, and an internet button 406 from the left.

At the lower portion of these buttons 403 to 406, there is provided a single button dialing section 408 having a plurality of one-touch dial buttons 407 arranged. Moreover, a program communication section 410, having a plurality of program buttons 409 arranged, is provided at the lower portion of the single button dialing section 408.

At the lower portion of the program communication section 410, there are arranged a redial/pose button 411, a abbreviated dialing button 412, a sub-address/hook button 413, a clear/monitor volume button 414, a set button 415, and a monitor button 416 from the left.

At the lower portion of these buttons 411 to 416 and the left of the panel section 203, there is a numeric keypad 418 having a plurality of numeric buttons. At the right of the numeric keypad 418, there are arranged a stop button 419, a copy button 420, and a start button 421.

Figure 5:
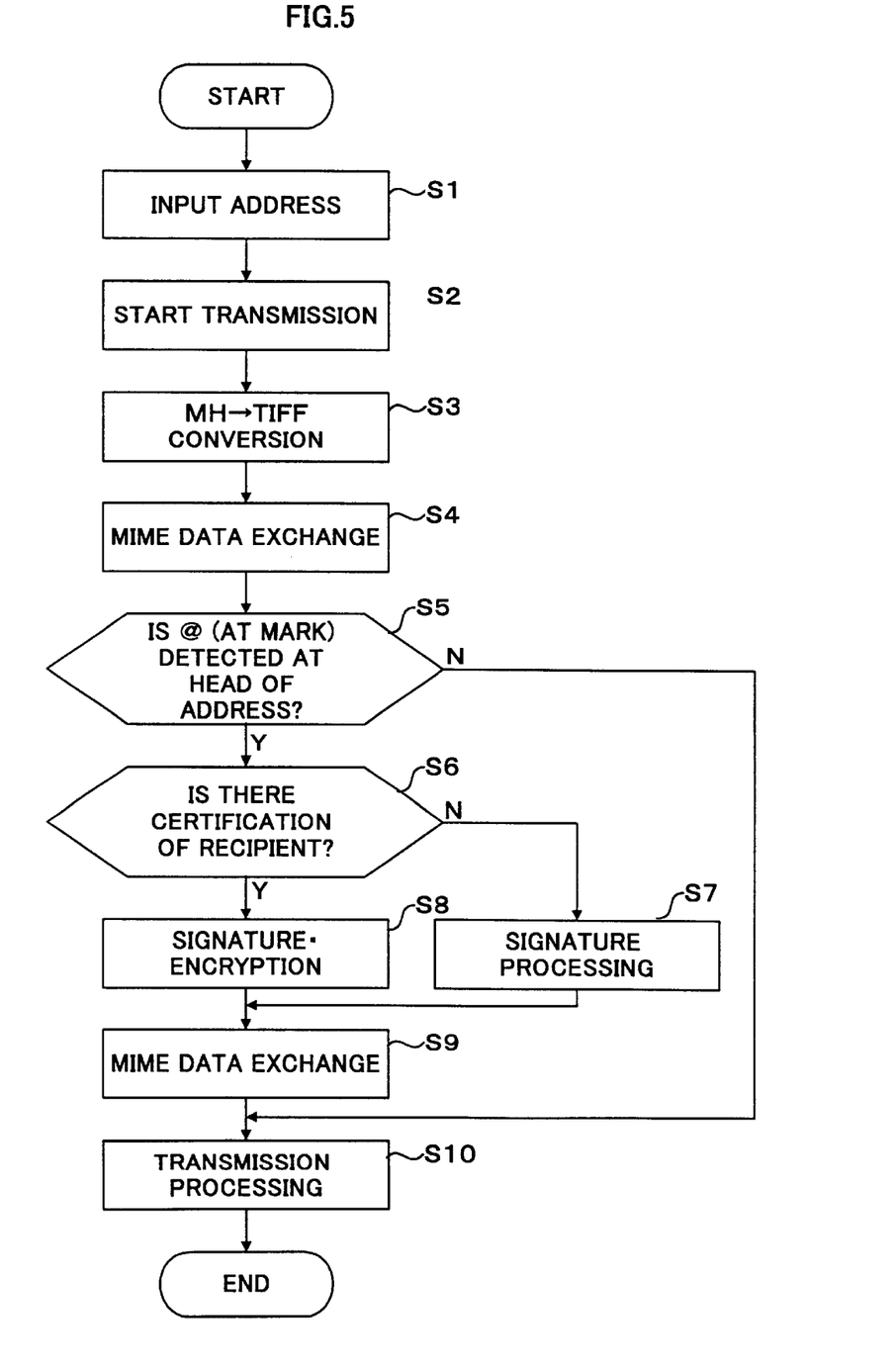
FIG. 5 is a processing flowchart of the image communication apparatus according to the first embodiment of the present invention.

Next, the following will explain an operation in which the image communication apparatus according to the present invention detects a specific identification character and performs specific processing. In this case, it is assumed that an "@ (at mark)" is used as a specific identification character, and encryption processing is performed as specific processing. Also, it is assumed that a case in which an operator inputs an e-mail address "@aaa@bbb.Ccc.co.jp" where the identification character "@" is added to the head of a normal e-mail address is input, and that a case in which the normal e-mail address "aaa@bbb.Ccc.co.jp" is input FIG. 5 is a processing flowchart of the image communication apparatus according to the first embodiment of the present invention. When an operator enters data to the panel section 203 and signals are input to the panel CPU 204 from the panel section 203 (step S1), the panel CPU 204 controls the input signals and transmits it to the CPU 205. The CPU 205 starts a transmitting operation when receiving the input signals (step S2). Next, the compression/decompression section of the facsimile section 206 compresses bit map data to an MH compressed format so as to obtain MH files, and sends the MH files to the TIFF converting section 301. The TIFF converting section 301 converts the MH files to a TIFF file (step S3).

Next, the MIME exchange section 306 adds the TIFF file into the data section of the multi-part mail in accordance with MIME, and generates an e-mail including the TIFE file as an appended file (step S4). Processing in step S4 is hereinafter referred to as MIME data exchange.

Next, the mail address analyze section 308 analyzes input data and detects the identification character "@". The mail address analyze section 308 sends the analysis result to the determination section 309. The determination section 309 determines whether or not encryption processing is performed in later steps based on the analysis result (step S5). In other words, when the identification character "@" is not added to the head of the recipient address (the mail address analyze section 308 detects no identification character "@" in input data), processing moves to step S10.

While, when the identification character "@" is added to the head of the recipient address (the mail address analyze section 308 detects an identification character "@" in input data), processing moves to step S6. Here, the determination section 309 determines whether or not there is a certification of recipient (step S6). This certification is data which is certified by a third party, and contains expiration data, certifier/publisher information, user information, and user public key information, as defined by ITU-T x.509. More specifically, this is used in a certification such as S/MIME, SSL (Secure Socket Layer). If there is no certification of recipient, only signature processing is performed without executing encryption processing (step S7). The signature processing here means that message digest obtained by algorithm such as MD2/MD5/SHA1 is encrypted by a encryption format such as RSA.

While, if there is a certification of recipient, signature processing and encryption processing are performed (step S8). Next, MIME data exchange is performed again, and e-mail transmission processing is performed (step S10).

In step S5, when the identification character "@" is detected at the head of the recipient address, the address editing section 304 deletes the identification character, and sends the recipient address to the header editing section 305. The header editing section 305 adds the mail address into a [To:] field. As a result, since the same e-mail as the normal e-mail is transmitted to the server 103, no error occurs in the mail server 103 even if the operator adds the identification character "@" to the recipient address.

Figure 6A:
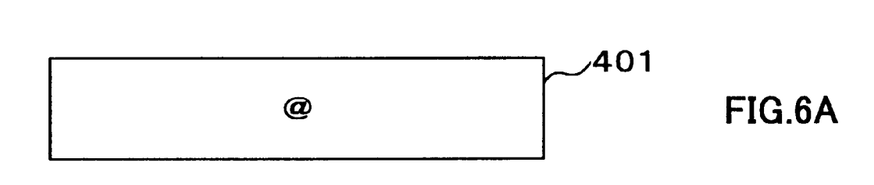
FIGS. 6A to 6D are views each showing a change in a content of a display in the image communication apparatus according to the first embodiment of the present invention.
Figure 6B:
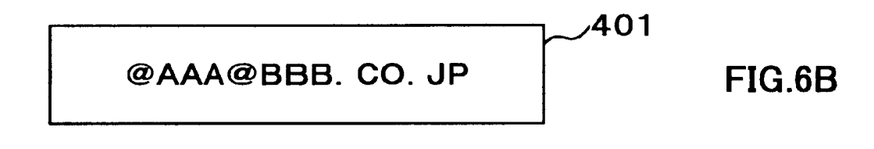
Figure 6C:
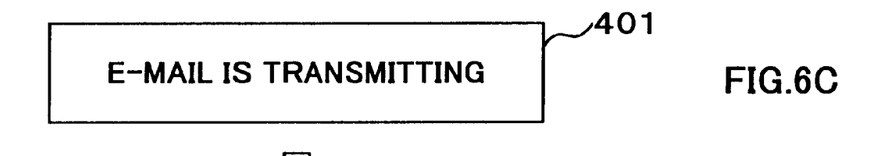
Figure 6D:
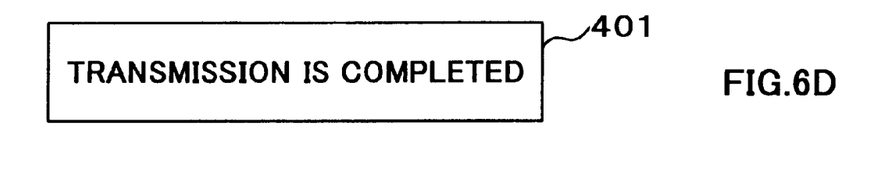

Next, the following will explain an operation procedure to be made when the operator carries out data transmission in the image communication apparatus according to the first embodiment. The following will explain a case in which an original is transmitted in the Internet facsimile communications. The operator places an original on a document placement stage and depresses the internet button 406 of the panel section 203. This changes the input mode of the panel section 203 to a character input mode. As a result, one-touch dial buttons 407 and program buttons 409 can be used to input characters such as alphabets and symbols. The operator inputs a mail address using one-touch dial buttons 407 and program buttons 409. FIGS. 6A to 6D are views each showing a change in a content of a display in the image communication apparatus according to the first embodiment. It is assumed that the operator instructs the image communication apparatus to perform encryption processing. When the operator inputs the identification character "@" from the panel section 203, the identification character "@" is displayed on the display 401 as shown in FIG. 6A. Sequentially, when the operator inputs the mail address using one-touch dial buttons 407 and program buttons 409, the mail address is displayed on the display 401 after the identification character "@" as shown in FIG. 6B. The operator depresses the start button 421 after watching and confirming the input characters on the display 401. As a result, a signal representing the input characters is transmitted to CPU 207 from the panel CPU 404 through CPU 205. Thereafter, CPU 207 scans the original and converts image data to an e-mail, and transmits the converted e-mail. At this time, as shown in FIG. 6C, a message "E-mail is transmitting" is displayed on the display 401, and when the e-mail transmission is ended, a message "Transmission is completed" is displayed thereon as shown in FIG. 6D.

Thus, according to the first embodiment, when the operator inputs the characters using the buttons of the panel section 203, the characters, including the identification character "@", are displayed on the display 401. Therefore, the operator can confirm on the display whether or not the input characters includes identification character "@". Also, since the input signal representing the input characters is transmitted to CPU 207 only after the start button 421 is depressed, encryption processing and the data transmission can be executed by the operator's will. Moreover, since the operation for instructing the above-mentioned encryption processing is substantially the same as the operation for data transmission in the normal facsimile apparatus, the operator can easily carry out the operation.

In the above explanation, the characters are input using one-touch dial buttons 407 and program buttons 409. However, the characters in which the identification character "@" is added to the mail address may input in the one-touch dial buttons 407 are registered in a one-touch dial button 407, and the registered characters may be input using the one-touch dial button 407.

Thus, in the image communication apparatus according to the first embodiment of the present invention, it is determined whether or not the identification character "@" is added to the head of the recipient address, and when the identification character "@" is added thereto, encryption processing can be executed. This eliminates the need for providing a switch for encryption processing to the panel section. Also, the operator has only to add the identification character "@" to the head of the recipient address to allow the image communication apparatus to perform encryption processing. As a result, the simplification of the operation can be improved.

In the above explanation, "@" was used as the specific identification character. However, the present invention is not limited to this identification character. Also, in the above explanation, the identification character "@" was added to the head of the recipient address. However, this may be inserted to the recipient address.

Moreover, encryption processing was performed as specific processing, which is made to correspond to the identification character. However, the present invention is not limited to this processing.

Second Embodiment

Next, the image communication apparatus according to a second embodiment will be explained. In the image communication apparatus according to the second embodiment, a plurality of identification characters are added to the head of the recipient address, and a plurality of processing is executed by recognizing the plurality of identification characters. This makes it possible to add a plurality of new functions without providing the switch to the panel section and without changing software in the panel section. It should be noted that the configuration of the image communication apparatus according to the second embodiment is the same as the first embodiment, and the explanation will be omitted.

Figure 7:
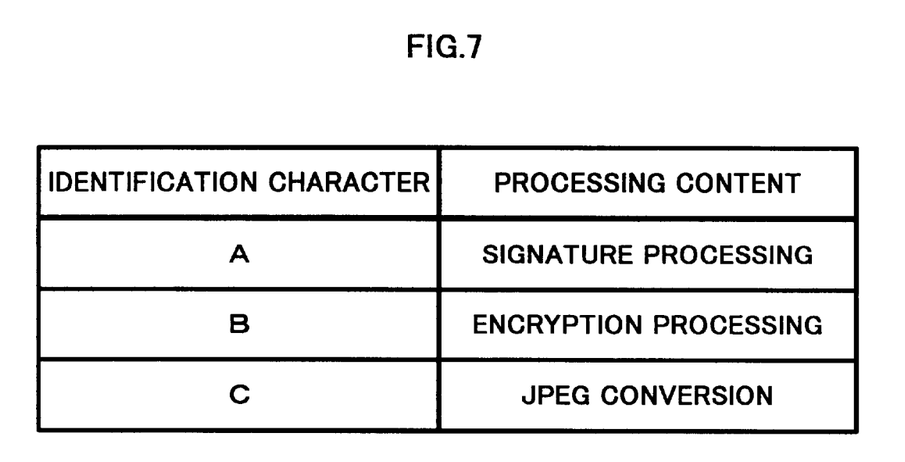
FIG. 7 is a view showing the corresponding relationship between the identification characters of the image communication apparatus according to a second embodiment of the present invention and the processing contents thereof.

FIG. 7 is a view showing an identification character/processing table in which the identification characters of the image communication apparatus according to a second embodiment of the present invention and the processing contents thereof are made to correspond to each other.

The identification character/processing table is stored in RAM 209. Here, as identification characters, characters A to C are used in addition to "@", and processing contents are determined in association with these identification characters, respectively. When the identification "A" is added, signature processing is carried out. When the identification "B" is added, encryption processing is carried out. When the identification "C" is added, JPEG conversion is carried out. The JPEG conversion is herein referred to processing for converting the MH file to the JPEG file.

In the second embodiment of the present invention, the operator inputs identification characters in which a plurality of identification characters are added to the head of the recipient address from the panel section 203 when adding the respective functions of signature processing, encryption processing, and JPEG conversion. More specifically, the identification characters "A" to "C", which correspond to the respective additional functions, are added after the identification character "@", and an identification character "@" is further inserted between these identification characters and the mail address.

According to the second embodiment, the determination section 309 determines an additional function from signature processing, encryption processing, and JPEG processing based on the analysis result obtained by the mail address analyze section 308 and the character/processing table so as to allow the additional function to execute processing the additional function.

Next, the following will explain an operation in which the image communication apparatus according to the second embodiment of the present invention detects specific identification characters to perform specific processing. Here, it is assumed that "@" and "A" to "C" shown in FIG. 7 are used as specific identification characters and that signature processing and encryption processing or JPEG processing, which are shown in FIG. 5 are performed as specific processing. Also, two cases are assumed. That is, one is that the operator inputs a recipient address "@ABC@aaa@bbb.Ccc.co.jp" in which "@" and the other identification characters are added to the head portion, and the other is that the operator inputs a normal recipient address "aaa@bbb.Ccc.co.jp".

Figure 8:
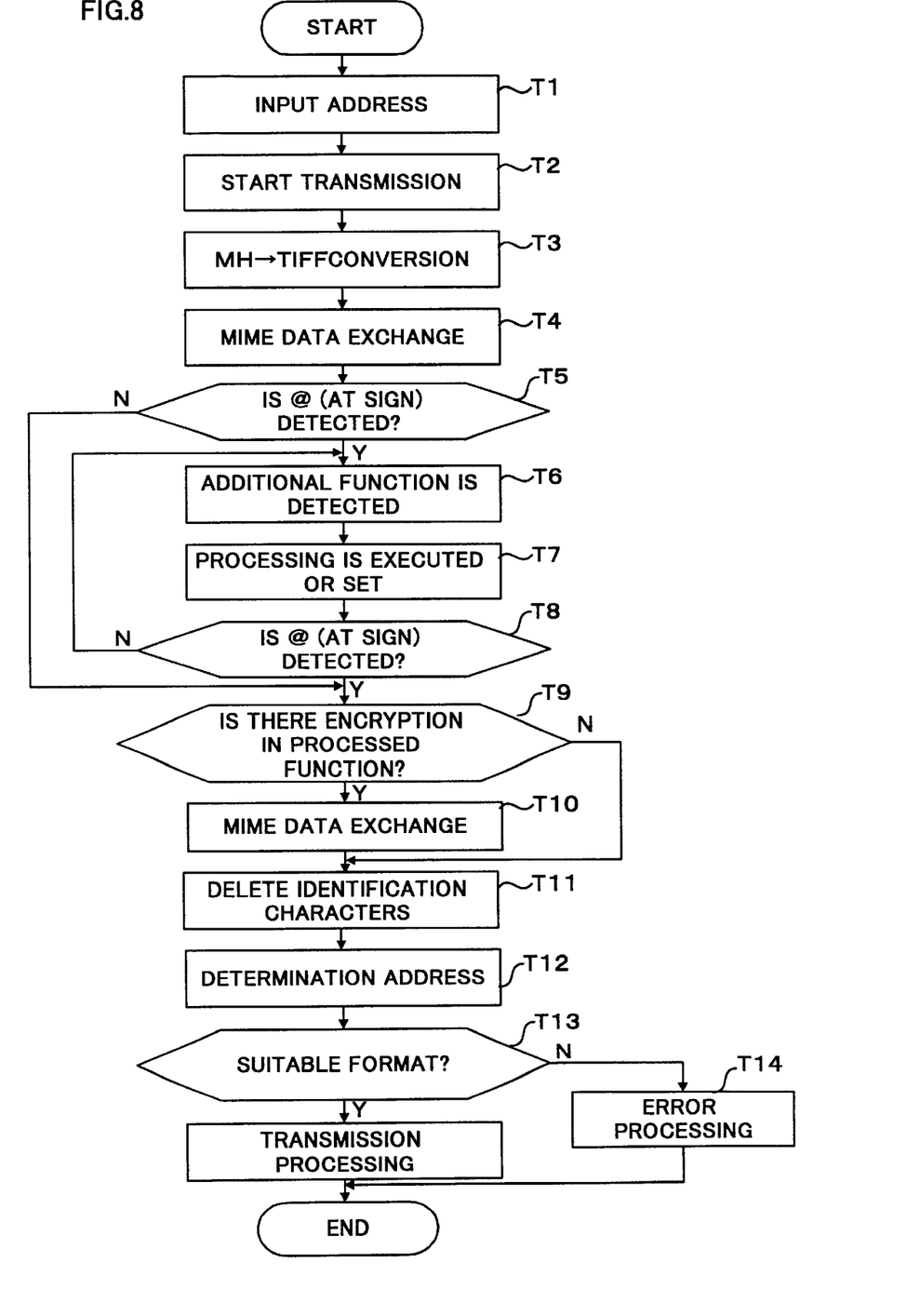
FIG. 8 is a processing flowchart of the image communication apparatus according to the second embodiment of the present invention.

FIG. 8 is a processing flowchart of the image communication apparatus according to the second embodiment of the present invention. Data is input from the panel section 203. When data inputs from the panel section 203 and the panel section 203 sends an input signal to the panel CPU 204 (step T1), the panel CPU 204 controls the input signal and transmits it to the CPU 205 and the CPU 205 starts a transmitting operation (step T2). Next, the compression/decompression section of the facsimile section 206 compresses bit map data to MH files, and sends the MH files to the TIFF converting section 301. The TIFF converting section 301 converts the MH files to a TIFF file (step T3). Next, the MIME exchange section 306 of the mail generate section 303 performs MIME data exchange (step T4).

Next, the mail address analyze section 308 analyzes input data and detects the identification character "@" and "A" to "B" after the identification character "@". The mail address analyze section 308 sends the analysis result to the determination section 309. The determination section 309 determines whether or not encryption processing is performed in later steps based on the analysis result (step T5). In other words, when the identification character "@" is not added to the head of the recipient address (the mail address analyze section 308 detects no identification character "@" in input data), processing moves to step T9.

While, when the identification character "@" is added to the head of the recipient address (the mail address analyze section 308 detects the identification character "@" in input data), it is determined by which identification character in "A" to "C" the additional function is designated (step T6). In other words, when the mail address analyze section 308 detects the characters "A" to "C" after the identification character "@" the determination section 309 determines that processing according with these characters is executed .

For example, in this case, when the character "A" is detected, signature processing is performed (step T7). Next, it is determined whether or not there is the identification character "@" (step T8). Then, when no identification character "@" is detected, processing goes to step T6, and processing is performed in accordance with further added identification characters. In this example, since characters "B" and "C" are added, encryption processing and JPEG conversion are also performed.

When the identification character "@" is detected in the step T5, the determination section 308 checks whether or not there is encryption processing in these processing after all processing to be executed are ended (step T9). In this case, if there is no encryption processing in these executed processing, processing goes to step T11. If there is encryption processing in these executed processing, MIME data exchange is performed (step T10).

Next, the mail address editing section 304 deletes the identification characters from input data (step T11). Regarding this deletion, the identification character "@" put at the head of input data and the second identification character "@", and the identification characters put therebetween are deleted. At this time, if there is no second identification character "@" due to operator error, a user name "aaa" of recipient address is erroneously deleted. For this reason, it is determined whether or not the edited recipient address is a suitable format (step T13). If the edited recipient address is not the suitable format, error processing is performed (step T14). Then, if the edited recipient address is the suitable format, transmission processing is performed (step T15).

Thus, according to the image communication apparatus according to the second embodiment of the present invention, it is determined whether or not the identification character "@" is put at the head of the e-mail address. If the identification character "@" is put at the head of the e-mail address, it is determined which identification character is added next. Then, processing is performed in accordance with the identification character. This makes it possible to add a plurality of new functions without providing a switch for performing encryption processing to the panel section 203. Also, the operator has only to add the identification character "@" to the head of the e-mail address and the characters corresponding to the additional functions to allow the image communication apparatus to perform encryption processing. As a result, the simplification of the operation can be improved.

In the explanation of the second embodiment, "@", "A" to "C" were used as the specific identification characters. However, the present invention is not limited to these identification characters.

The above first and second embodiments showed signature processing, encryption processing or JPEG processing as specific processing corresponding to the identification characters. However, the present invention is not limited to these processing. As other specific processing, there are a request of delivery notice and an instruction of data communication in which data is divided to a plurality of fragments.

Moreover, the above first and second embodiments explained the case in which the image communication apparatus of the present invention was applied to Internet facsimile apparatus 105. However, the present invention can be widely applied to the e-mail apparatus. For example, the present invention can be applied to a server, which receives image data from one client and distributes it to the other client.

In other words, the server apparatus receives image data from the sender, and stores received image data to the memory. While, the server apparatus receives the characters including recipient information and the identification characters by an e-mail from the sender, and determines whether or not a specific identification character is included in the received characters. If it is determined that the specific character is included therein, the server executes processing, which is made to correspond to the identification character, with respect to image data stored in the memory. Thereafter, the server transmits processed image data to the sender in accordance with an e-mail transfer protocol.

Also, the present invention can be applied to a copy machine, a scanner, and an image combination machine, which have e-mail transmitting functions similar to the above Internet facsimile apparatus 105.

Furthermore, the present invention includes a storage medium having a program executed by CPU to carry out the same processing as Internet facsimile apparatus 105 according to the first and second embodiments. Moreover, the present invention can be applied to a personal computer, having a scanner connected thereto and a network communication section, for executing a program stored in the storage medium.

Furthermore, the above-explained encryption processing may be S/MIME, or PGP (Pretty Good Privacy). However, the present invention is not limited to these encryption processing.

The present invention is not limited to the above described embodiments, and various variations and modifications may be possible without departing from the scope of the present invention.

This application is based on the Japanese Patent Application No.HEI 11-87976 filed on Mar. 30, 1999, entire content of which is expressly incorporated by reference herein.

What is claimed is:

1. An e-mail communication apparatus, comprising:
    an operation panel that is configured to input destination address data;
    an acceptor that accepts image data;
    a converter that converts the accepted image data into e-mail data;
    a detector that detects whether or not the input destination address data includes a specific identification character in addition to a complete destination address;
    an address processor that analyzes the destination address data, and extracts a destination address;
    a controller that performs a predetermined process corresponding to the specific identification character, to the converted e-mail data when said detector detects the specific identification character in the input destination address data; and
    a transmitter that transmits the e-mail data to the extracted destination address in accordance with an e-mail transfer protocol with the predetermined process performed when said detector detects the specific identification character, and transmits the e-mail data without performing the predetermined process, to the extracted destination address in accordance with the e-mail transfer protocol when said detector does not detect the specific identification character in the input destination address data, the predetermined process being distinct from routing and addressing processes performed by said transmitter.

2. The apparatus according to claim 1, wherein said operation panel inputs the specific identification character so that the specific identification character is at a beginning of the destination address data.

3. The apparatus according to claim 2, wherein the specific identification character comprises a @ mark.

4. The apparatus according to claim 1, wherein said controller performs encryption processing of the e-mail data when said detector detects the specific identification character in the destination address data.

5. The apparatus according to claim 1, wherein said controller performs JPEG conversion to the e-mail data when said detector detects the specific identification character in the destination address data.

6. The apparatus according to claim 1, wherein said detector is configured to detect a plurality of different specific identification characters in the destination address data.

7. The apparatus according to claim 6, wherein said controller performs a plurality of predetermined processes to the e-mail data corresponding to each of the different specific identification characters.

8. The apparatus according to claim 1, further comprising a facsimile section that transmits the accepted image data to a destination facsimile apparatus via a public switched telephone network.

9. The apparatus according to claim 8, wherein said converter, said detector, said controller and said transmitter are integrated in a LAN board, and said acceptor and said facsimile section are integrated in a facsimile body.

10. An e-mail communication apparatus comprising:
    a destination address acceptor that obtains destination address data;

an acceptor that accepts image data;

a converter that converts the accepted image data into e-mail data;

a detector that detects whether or not the input destination address data includes a specific identification character in addition to a complete destination address;

an address processor that analyzes the destination address data, and extracts a destination address;

a controller that performs a predetermined process corresponding to the specific identification character, to the converted e-mail data when said detector detects the specific identification character in the input destination address data; and a transmitter that transmits the e-mail data to the extracted destination address in accordance with an e-mail transfer protocol with the predetermined process performed when said detector detects the specific identification character, and transmits the e-mail data without performing the predetermined process, to the extracted destination address in accordance with the e-mail transfer protocol when said detector does not detect the specific identification character in the input destination address data, said predetermined process being distinct from the routing and addressing processes of said transmitter.

11. A method for communicating by e-mail, using a communication apparatus that includes an operation panel, the method comprising:

inputting destination address data from the operation panel;

accepting image data;

converting the accepted image data into e-mail data;

detecting whether or not the input destination address data includes a specific identification character in addition to a complete destination address;

analyzing the destination address data, and extracting a destination address;

performing a predetermined process corresponding to the specific identification character, to the converted e-mail data when the specific identification character is detected in the input destination address data; and transmitting the e-mail data to the extracted destination address in accordance with an e-mail transfer protocol with the predetermined process performed when the specific identification character is detected, and transmitting the e-mail data without performing the predetermined process, to the extracted destination address in accordance with the e-mail transfer protocol when the specific identification character is not detected in the input destination address data, the predetermined process being distinct from routing and addressing processes performed by the transmitting.

12. The method according to claim 11, wherein the inputting of the destination address data provides that the specific identification character is at a beginning of the destination address data.

13. The method according to claim 12, wherein the specific identification character comprises a @ mark.

14. The method according to claim 11, wherein the performing of a the predetermined process comprises encryption processing the e-mail data.

15. The method according to claim 11, wherein the performing of a the predetermined process comprises JPEG conversion of the e-mail data.

16. The method according to claim 11, wherein the detecting comprises detecting a plurality of different specific identification characters in the input destination address data.

17. The method according to claim 16, wherein the performing of a predetermined process comprises performing a plurality of predetermined processes to the e-mail data corresponding to each of the different specific identification characters.

18. The method according to claim 11, further comprising transmitting the accepted image data to a destination facsimile apparatus via a public switched telephone network.

19. The method according to claim 18, wherein the converting, the detecting, the controlling and the transmitting are performed in a LAN board, and the accepting and the transmitting to the destination facsimile apparatus are performed in a facsimile body.

20. A method for communicating by e-mail, using a communication apparatus, the method comprising:

obtaining destination address data;

accepting image data;

converting the accepted image data into e-mail data;

detecting whether or not the input destination address data includes a specific identification character in addition to a complete destination address;

analyzing the destination address data, and extracting a destination address;

performing a predetermined process corresponding to the specific identification character, to the converted e-mail data when the specific identification character is detected in the input destination address data; and transmitting the e-mail data to the extracted destination address in accordance with an e-mail transfer protocol with the predetermined process performed when the specific identification character is detected, and transmitting the e-mail data without performing the predetermined process, to the extracted destination address in accordance with the e-mail transfer protocol when the specific identification character is not detected in the input destination address data, the predetermined process being distinct from routing and addressing processes performed by the transmitting.

* * * * *